(12) United States Patent
Jiang et al.

(10) Patent No.: US 8,537,640 B2
(45) Date of Patent: Sep. 17, 2013

(54) ACTIVE SONAR SYSTEM

(75) Inventors: Kai-Li Jiang, Beijing (CN); Liang Liu, Beijing (CN); Chen Feng, Beijing (CN); Li Qian, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 507 days.

(21) Appl. No.: 12/661,130

(22) Filed: Mar. 11, 2010

(65) Prior Publication Data

US 2011/0063951 A1 Mar. 17, 2011

(30) Foreign Application Priority Data

Sep. 11, 2009 (CN) .......................... 2009 1 0190416

(51) Int. Cl.
*B60B 1/02* (2006.01)
(52) U.S. Cl.
USPC .......................................... 367/141; 977/902
(58) Field of Classification Search
CPC .................................. H04B 13/02; H04R 1/44
USPC ................. 367/141, 140; 977/742, 902, 953
See application file for complete search history.

(56) References Cited

U.S. PATENT DOCUMENTS

| | | | |
|---|---|---|---|
| 1,528,774 A | 3/1925 | Kranz | |
| 3,670,299 A | 6/1972 | Kahn | |
| 3,982,143 A | 9/1976 | Tamura et al. | |
| 4,002,897 A | 1/1977 | Kleinman et al. | |
| 4,045,695 A | 8/1977 | Itagaki et al. | |
| 4,334,321 A | 6/1982 | Edelman | |
| 4,503,564 A | 3/1985 | Edelman et al. | |
| 4,641,377 A | 2/1987 | Rush et al. | |
| 4,689,827 A | 8/1987 | Gurney, Jr. | |
| 4,766,607 A | 8/1988 | Feldman | |
| 5,694,477 A | 12/1997 | Kole | |
| 6,307,300 B1 | 10/2001 | Yamamoto et al. | |

(Continued)

FOREIGN PATENT DOCUMENTS

| | | |
|---|---|---|
| CN | 2083373 | 8/1991 |
| CN | 2251746 Y | 4/1997 |

(Continued)

OTHER PUBLICATIONS

Cornwell et al.; Million-Atom Count Simulations of the Effects of Carbon Nanotube Length Distributions on Fiber Mechanical Properties; 2009 DoD High Performance Computing Modernization Program Users Group Conference; Jun. 15-18; Abstract. http://doi.ieeecomputersociety.org/10.1109/HPCMP-UGC.2009.33.*

(Continued)

*Primary Examiner* — Daniel Pihulic
(74) *Attorney, Agent, or Firm* — Altis Law Group, Inc.

(57) ABSTRACT

An active sonar system includes at least one transmitter to transmit an acoustic signal, at least one receiver to receive a reflected acoustic signal, and an electronic cabinet to control the at least one transmitter to transmit the acoustic signal and the receiver to receive the reflected acoustic signal. At least one transmitter includes at least one carbon nanotube transmitting transducer. At least one carbon nanotube transmitting transducer includes at least one first electrode, at least one second electrode, and an acoustic element. The acoustic element includes a carbon nanotube structure that is electrically connected to at least one first electrode and at least one second electrode.

20 Claims, 13 Drawing Sheets

(56) References Cited

U.S. PATENT DOCUMENTS

| | | |
|---|---|---|
| 6,473,625 B1 | 10/2002 | Williams et al. |
| 6,583,533 B2 * | 6/2003 | Pelrine et al. .................. 977/742 |
| 6,683,783 B1 * | 1/2004 | Smalley et al. ................. 977/750 |
| 6,704,247 B1 * | 3/2004 | Ruffa .............................. 367/92 |
| 6,777,637 B2 | 8/2004 | Nakayama et al. |
| 6,803,116 B2 | 10/2004 | Ikeda |
| 6,803,840 B2 | 10/2004 | Hunt et al. |
| 6,808,746 B1 | 10/2004 | Dai et al. |
| 6,864,668 B1 | 3/2005 | McCune et al. |
| 6,921,575 B2 | 7/2005 | Horiuchi et al. |
| 7,045,108 B2 | 5/2006 | Jiang et al. |
| 7,130,436 B1 | 10/2006 | Tabata et al. |
| 7,242,250 B2 | 7/2007 | Tsurumi |
| 7,315,204 B2 | 1/2008 | Seven |
| 7,366,318 B2 | 4/2008 | Nevill |
| 7,393,428 B2 | 7/2008 | Huang et al. |
| 7,474,590 B2 | 1/2009 | Watabe et al. |
| 7,572,165 B2 | 8/2009 | Liu et al. |
| 7,723,684 B1 | 5/2010 | Haddon et al. |
| 7,799,163 B1 | 9/2010 | Mau et al. |
| 8,300,854 B2 * | 10/2012 | Jiang et al. ..................... 381/164 |
| 2001/0005272 A1 | 6/2001 | Buchholz |
| 2001/0048256 A1 | 12/2001 | Miyazaki et al. |
| 2002/0076070 A1 | 6/2002 | Yoshikawa et al. |
| 2003/0038925 A1 | 2/2003 | Choi |
| 2003/0152238 A1 | 8/2003 | Daly |
| 2003/0165249 A1 | 9/2003 | Higuchi |
| 2004/0053780 A1 | 3/2004 | Jiang et al. |
| 2004/0070326 A1 | 4/2004 | Mao et al. |
| 2004/0119062 A1 | 6/2004 | Lu et al. |
| 2005/0006801 A1 | 1/2005 | Kinloch et al. |
| 2005/0036905 A1 | 2/2005 | Gokturk |
| 2005/0040371 A1 | 2/2005 | Watanabe et al. |
| 2005/0129939 A1 | 6/2005 | Shigematsu et al. |
| 2005/0201575 A1 | 9/2005 | Koshida et al. |
| 2006/0072770 A1 | 4/2006 | Miyazaki |
| 2006/0104451 A1 | 5/2006 | Browning et al. |
| 2006/0147081 A1 | 7/2006 | Mango et al. |
| 2006/0264717 A1 | 11/2006 | Pesach et al. |
| 2007/0145335 A1 | 6/2007 | Anazawa |
| 2007/0161263 A1 | 7/2007 | Meisner |
| 2007/0164632 A1 | 7/2007 | Adachi et al. |
| 2007/0166223 A1 * | 7/2007 | Jiang et al. .................. 423/447.1 |
| 2007/0176498 A1 | 8/2007 | Sugiura et al. |
| 2008/0063860 A1 | 3/2008 | Song et al. |
| 2008/0095694 A1 | 4/2008 | Nakayama et al. |
| 2008/0170982 A1 * | 7/2008 | Zhang et al. ................ 423/447.3 |
| 2008/0248235 A1 | 10/2008 | Feng et al. |
| 2008/0260188 A1 | 10/2008 | Kim |
| 2008/0299031 A1 | 12/2008 | Liu et al. |
| 2008/0304201 A1 | 12/2008 | Takao et al. |
| 2009/0016951 A1 | 1/2009 | Kawabata et al. |
| 2009/0028002 A1 | 1/2009 | Sugiura et al. |
| 2009/0045005 A1 | 2/2009 | Byon et al. |
| 2009/0085461 A1 | 4/2009 | Feng et al. |
| 2009/0096346 A1 | 4/2009 | Liu et al. |
| 2009/0096348 A1 | 4/2009 | Liu et al. |
| 2009/0145686 A1 | 6/2009 | Watabe et al. |
| 2009/0153012 A1 | 6/2009 | Liu et al. |
| 2009/0167136 A1 | 7/2009 | Liu et al. |
| 2009/0167137 A1 | 7/2009 | Liu et al. |
| 2009/0196981 A1 | 8/2009 | Liu et al. |
| 2009/0232336 A1 | 9/2009 | Pahl |
| 2009/0268557 A1 | 10/2009 | Jiang et al. |
| 2009/0268562 A1 | 10/2009 | Jiang et al. |
| 2010/0054502 A1 | 3/2010 | Miyachi |
| 2010/0054507 A1 | 3/2010 | Oh et al. |
| 2010/0086166 A1 | 4/2010 | Jiang et al. |
| 2010/0166232 A1 | 7/2010 | Liu et al. |
| 2010/0233472 A1 | 9/2010 | Liu et al. |
| 2011/0001398 A1 * | 1/2011 | Kang et al. ..................... 977/750 |
| 2011/0063951 A1 * | 3/2011 | Jiang et al. ..................... 367/140 |
| 2011/0110535 A1 * | 5/2011 | Jiang et al. ..................... 977/932 |
| 2011/0171419 A1 | 7/2011 | Li et al. |
| 2011/0192016 A1 * | 8/2011 | Kang et al. ..................... 977/742 |
| 2011/0198559 A1 * | 8/2011 | Wang et al. ..................... 977/750 |
| 2011/0240621 A1 * | 10/2011 | Kessler et al. .................. 977/742 |
| 2012/0000293 A1 * | 1/2012 | Baughman et al. ........... 977/837 |
| 2012/0107594 A1 * | 5/2012 | Kang et al. ..................... 977/750 |

FOREIGN PATENT DOCUMENTS

| | | |
|---|---|---|
| CN | 2282750 Y | 5/1998 |
| CN | 2302622 | 12/1998 |
| CN | 2327142 | 6/1999 |
| CN | 1239394 | 12/1999 |
| CN | 1265000 | 8/2000 |
| CN | 2425468 | 3/2001 |
| CN | 2485699 Y | 4/2002 |
| CN | 1407392 | 4/2003 |
| CN | 1443021 | 9/2003 |
| CN | 1629627 | 6/2005 |
| CN | 1691246 | 11/2005 |
| CN | 1698400 | 11/2005 |
| CN | 1698400 A | 11/2005 |
| CN | 1711620 A | 12/2005 |
| CN | 2779422 Y | 5/2006 |
| CN | 1787696 | 6/2006 |
| CN | 2787870 | 6/2006 |
| CN | 2798479 | 7/2006 |
| CN | 1821048 | 8/2006 |
| CN | 1886820 | 12/2006 |
| CN | 1944829 | 4/2007 |
| CN | 1982209 | 6/2007 |
| CN | 1997243 | 7/2007 |
| CN | 101239712 | 8/2008 |
| CN | 101284662 | 10/2008 |
| CN | 201150134 | 11/2008 |
| CN | 101314464 | 12/2008 |
| CN | 101437663 | 5/2009 |
| CN | 101458221 A | 6/2009 |
| CN | 101471213 | 7/2009 |
| CN | 101715155 | 5/2010 |
| CN | 101400198 | 9/2010 |
| DE | 102005059270 | 6/2007 |
| JP | 49-24593 | 3/1974 |
| JP | 58-9822 | 1/1983 |
| JP | 58-19491 | 2/1983 |
| JP | 60-22900 | 2/1985 |
| JP | 61-294786 | 12/1986 |
| JP | 1-255398 | 10/1989 |
| JP | 3-147497 | 6/1991 |
| JP | 4-126489 | 4/1992 |
| JP | 6-33390 | 4/1994 |
| JP | 7-282961 | 10/1995 |
| JP | 8-20868 | 1/1996 |
| JP | 9-105788 | 4/1997 |
| JP | 11-282473 | 10/1999 |
| JP | 11-300274 | 11/1999 |
| JP | 2001333493 | 11/2001 |
| JP | 2002-186097 | 6/2002 |
| JP | 2002-352940 | 12/2002 |
| JP | 2002346996 | 12/2002 |
| JP | 2002542136 | 12/2002 |
| JP | 2003500325 | 1/2003 |
| JP | 2003-154312 | 5/2003 |
| JP | 2003198281 | 7/2003 |
| JP | 2003-266399 | 9/2003 |
| JP | 2003-319490 | 11/2003 |
| JP | 2003-319491 | 11/2003 |
| JP | 2003-332266 | 11/2003 |
| JP | 2003-343867 | 12/2003 |
| JP | 20042103 | 1/2004 |
| JP | 2004-107196 | 4/2004 |
| JP | 2004229250 | 8/2004 |
| JP | 2005-20315 | 1/2005 |
| JP | 2005-51284 | 2/2005 |
| JP | 2005-73197 | 3/2005 |
| JP | 2005-97046 | 4/2005 |
| JP | 2005189322 | 7/2005 |
| JP | 2005-235672 | 9/2005 |
| JP | 2005-318040 | 11/2005 |
| JP | 2005-534515 | 11/2005 |
| JP | 2005-341554 | 12/2005 |
| JP | 2005333601 | 12/2005 |

| | | |
|---|---|---|
| JP | 2006-93932 | 4/2006 |
| JP | 2006-180082 | 7/2006 |
| JP | 2006-202770 | 8/2006 |
| JP | 2006-217059 | 8/2006 |
| JP | 2006270041 | 10/2006 |
| JP | 2007-24688 | 2/2007 |
| JP | 2007-54831 | 3/2007 |
| JP | 2007-167118 | 7/2007 |
| JP | 2007-174220 | 7/2007 |
| JP | 2007-187976 | 7/2007 |
| JP | 2007-196195 | 8/2007 |
| JP | 2007-228299 | 9/2007 |
| JP | 2007-527099 | 9/2007 |
| JP | 2008-62644 | 3/2008 |
| JP | 2008-101910 | 5/2008 |
| JP | 2008-153042 | 7/2008 |
| JP | 2008-163535 | 7/2008 |
| JP | 2008-269914 | 11/2008 |
| JP | 2009-31031 | 2/2009 |
| JP | 2009-91239 | 4/2009 |
| JP | 2009-94074 | 4/2009 |
| JP | 200994074 | 4/2009 |
| JP | 2009-146896 | 7/2009 |
| JP | 2009-146898 | 7/2009 |
| JP | 2009-164125 | 7/2009 |
| JP | 2009-184907 | 8/2009 |
| JP | 2009-184908 | 8/2009 |
| JP | 2011059108 A * | 3/2011 |
| KR | 10-0761548 | 9/2007 |
| TW | 432780 | 5/2001 |
| TW | 568882 | 1/2004 |
| TW | 200603400 | 1/2006 |
| TW | I248253 | 1/2006 |
| TW | 200726290 | 7/2007 |
| TW | 200740976 | 11/2007 |
| TW | 200744399 | 12/2007 |
| TW | 200829675 | 7/2008 |
| TW | 200833862 | 8/2008 |
| TW | 200950569 | 12/2009 |
| TW | 201029481 | 8/2010 |
| WO | WO0073204 | 12/2000 |
| WO | WO2004012932 | 2/2004 |
| WO | WO2005102924 | 11/2005 |
| WO | WO2005120130 | 12/2005 |
| WO | WO 2007015710 A2 * | 2/2007 |
| WO | WO2007043837 | 4/2007 |
| WO | WO2007049496 | 5/2007 |
| WO | WO2007052928 | 5/2007 |
| WO | WO2007099975 | 9/2007 |
| WO | WO2007111107 | 10/2007 |
| WO | WO2008/029451 | 3/2008 |
| WO | WO 2010019942 A2 * | 2/2010 |

OTHER PUBLICATIONS

Aliev et al.; Underwater Sound Generation Using Carbon Nanotube Projectors; Copyrighted Jan. 21, 2010; American Chemical Society; pp. 2374-2380.*
Amos, S.W.; "Principles of Transistor Circuits"; 2000; Newnes-Butterworth-Heinemann; 9th ed.;p. 114.
Yang Wei, Kaili Jiang, Xiaofeng Feng, Peng Liu et al., Comparative studies of multiwalled carbon nanotube sheets before and after shrinking, Physical Review B, Jul. 25, 2007, vol. 76, 045423.
Lin Xiao, Zhuo Chen, Chen Feng, Liang Liu et al., Flexible, Stretchable, Transparent Carbon Nanotube Thin Film Loudspeakers, Nano Letters, 2008, pp. 4539-4545, vol. 8, No. 12, US.
J-J. Hopfield, Spectra of Hydrogen, Nitrogen and Oxygen in the Extreme Ultraviolet, Physical Review, 1922, pp. 573-588,vol. 20. http://www.physorg.com/news123167268.html.
Lee et al., Photosensitization of nonlinear scattering and photoacoustic emission from single-walled carbon nanotubes, Applied Physics Letters, 13, Mar. 2008, 92, 103122.

Alexander Graham Bell, Selenium and the Photophone, Nature, Sep. 23, 1880, pp. 500-503.
Silvanus P. Thompson, The Photophone, Nature, 23, Sep. 1880, vol. XXII, No. 569, pp. 481.
Chen, Huxiong; Diebold, Gerald, "Chemical Generation of Acoustic Waves: A Giant Photoacoustic Effect", Nov. 10, 1995, Science, vol. 270, pp. 963-966.
F. Kontomichos et al ., "A thermoacoustic device for sound reproduction", acoustics 08' Paris, Jun. 29-Jul. 4, 2008.
P.M. Ajayan et al., "Nanotubes in a flash-Ignition and reconstruction", Science, vol. 296, pp. 705, Apr. 26, 2002.
F.Kontomichos et al., "A thermoacoustic device for sound reproduction", acoustics 08 Paris, pp. 4349-4353, Jun. 29-Jul. 4, 2008.
Lin Xiao et al., "Flexible, stretchable, transparent carbon nanotube thin film loudspeakers" vol. 8, No. 12, pp. 4539-4545 ,2008.
Kai Liu, Yinghui Sun, Lei Chen, Chen Feng, Xiaofeng Feng, Kaili Jiang et al., Controlled Growth of Super-Aligned Carbon Nanotube Arrays for Spinning Continuous Unidirectional Sheets with Tunable Physical Properties, Nano Letters, 2008, pp. 700-705, vol. 8, No. 2.
Yang Wei, Kaili Jiang, Xiaofeng Feng, Peng Liu et al, Comparative studies of multiwalled carbon nanotube sheets before and after shrinking, Physical Review B, Jul. 25, 2007, vol. 76, 045423.
Strutt John William, Rayleigh Baron, The Theory of Sound, 1926, pp. 226-235, vol. 2.
Kaili Jiang, Qunqing Li, Shoushan Fan, Spinning continuous carbon nanotube yarns, Nature, Oct. 24, 2002, pp. 801, vol. 419.
Lina Zhang, Chen Feng, Zhuo Chen, Liang Liu et al., Superaligned Carbon Nanotube Grid for High Resolution Transmission Electron Microscopy of Nanomaterials, Nano Letters, 2008, pp. 2564-2569, vol. 8, No. 8.
Lin Xiao, Zhuo Chen, Chen Feng, Liang Liu et al, Flexible, Stretchable, Transparent Carbon Nanotube Thin Film Loudspeakers, Nano Letters, 2008, pp. 4539-4545, vol. 8, No. 12, US.
W. Yi, L.Lu, Zhang Dianlin et al., Linear Specific Heat of Carbon Nanotubes, Physical Review B, Apr. 1, 1999, vol. 59, No. 14, R9015-9018.
Frank P. Incropera, David P. Dewitt et al., Fundamentals of Heat and Mass Transfer, 6th ed., 2007, pp. A-5, Wiley:Asia.
Zhuangchun Wu, Zhihong Chen, Xu Du et al.,Transparent, Conductive Carbon Nanotube Films, Science, Aug. 27, 2004, pp. 1273-1276, vol. 305.
P. De Lange, On Thermophones, Proceedings of the Royal Society of London. Series A, Apr. 1, 1915, pp. 239-241, vol. 91, No. 628.
William Henry Preece, On Some Thermal Effects of Electric Currents, Proceedings of the Royal Society of London, 1879-1880, pp. 408-411, vol. 30.
Swift Gregory W., Thermoacoustic Engines and Refrigerators, Physics Today, Jul. 1995, pp. 22-28, vol. 48.
Braun Ferdinand, Notiz uber Thermophonie, Ann. Der Physik, Apr. 1898, pp. 358-360,vol. 65.
H.D. Arnold, I.B. Crandall, The Thermophone as a Precision Source of Sound, Physical Review, 1917, pp. 22-38, vol. 10.
Xiaobo Zhang, Kaili Jiang, Chen Feng, Peng Liu et al., Spinning and Processing Continuous Yarns from 4-Inch Wafer Scale Super-Aligned Carbon Nanotube Arrays, Advanced Materials, 2006, pp. 1505-1510, vol. 18.
Edward C. Wente, The Thermophone, Physical Review, 1922, pp. 333-345,vol. 19.
J.J.Hopfield, Spectra of Hydrogen, Nitrogen and Oxygen in the Extreme Ultraviolet, Physical Review, 1922, pp. 573-588,vol. 20. http://www.physorg.com/news123167268.html, Feb. 2008.
Mei Zhang, Shaoli Fang, Anvar A. Zakhidov, Sergey B. Lee et al., Strong, Transparent, Multifunctional, Carbon Nanotube Sheets, Science, Aug. 19, 2005, pp. 1215-1219, vol. 309.

* cited by examiner

ACTIVE SONAR SYSTEM

RELATED APPLICATIONS

This application claims all benefits accruing under 35 U.S.C. §119 from China Patent Application No. 200910190416.3, filed on Sep. 11, 2009 in the China Intellectual Property Office.

TECHNICAL FIELD

The present disclosure relates to an active sonar system based on carbon nanotubes.

DESCRIPTION OF RELATED ART

SONAR (Sound Navigation and Ranging) is a technique that uses sound propagation under water to navigate or to detect objects in or on the water. As is known in the art, there are two types of sonar: passive sonar and active sonar. Passive sonar seeks to detect an object target by listening for the sound emanating from the object being sought. Active sonar creates a pulse of sound, and then listens for reflections of the pulse from a target object.

An active sonar system for detecting objects in the water usually includes a transmitter, a receiver, an electronic cabinet, and an auxiliary device. The transmitter includes a transmitting transducer array capable of continuously transmitting an acoustic signal. The receiver includes a receiving transducer array capable of receiving a reflected acoustic echo of said acoustic signal from the objects. The electronic cabinet includes a sensor, a display, and a process control computer. The auxiliary device includes powder, a carrier, a rotatable device, and cables.

The transmitting transducer converts mechanical, electrical, and magnetic energy to sound energy. The transmitting transducer is usually a piezoelectric transducer consisting of a piezoelectric ceramic, a giant magnetostrictive transducer consisting of rare-earth alloy, or an electrostrictive transducer consisting of ferroelectric material, any of which make the structure of the transmitting transducer complicated.

What is needed therefore, is an active sonar system which has a transmitting transducer with simple structure.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
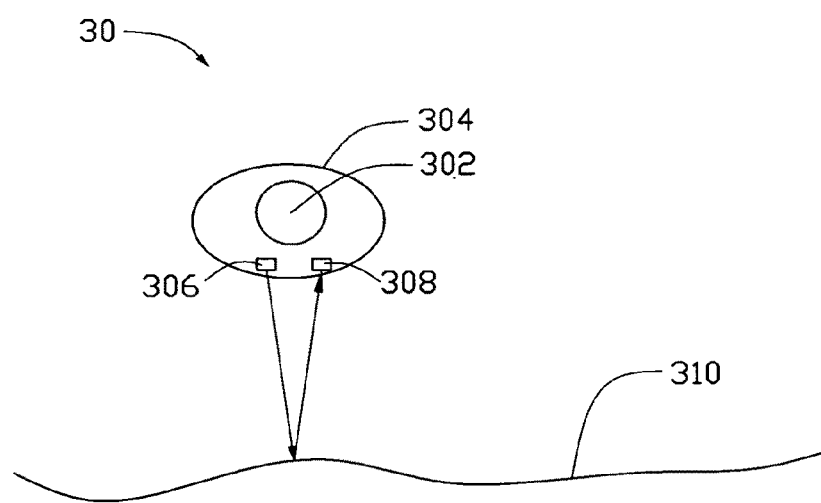
FIG. 1 is a schematic view of one embodiment of an active sonar system having a carbon nanotube transmitting transducer.

Referring to FIG. 1, one embodiment of an active sonar system 30 includes a transmitter 306, a receiver 308, and an electronic cabinet 302. The transmitter 306 and the receiver 308 are connected to the electronic cabinet 302 via cables (not shown). The active sonar system 30 can further include an underwater carrier 304 to accommodate and protect the transmitter 306, the receiver 308, and the electronic cabinet 302. The active sonar system 30 can include two or more transmitters 306 and two or more receivers 308. One of the transmitters 306 and one of the receivers 308 can be located on the underwater carrier 304 as a pair.

Figure 9:
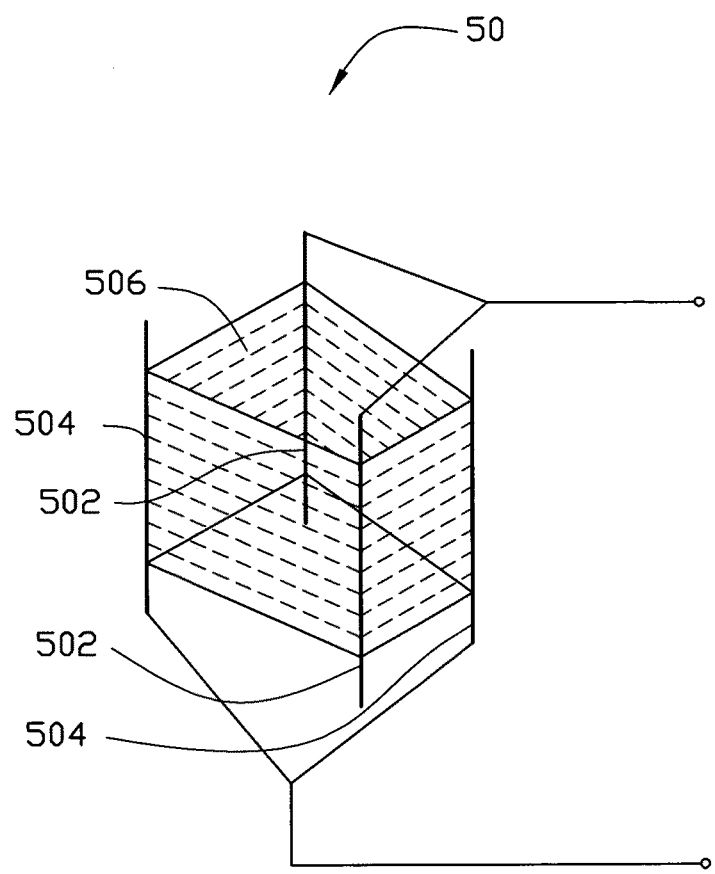
FIG. 9 is a schematic view of one embodiment of a cubic carbon nanotube transmitting transducer.

The transmitter 306 can include one or more transmitting transducers, such as a transmitting transducer array. The transmitter 306 transduces an electrical signal to an acoustic signal and transmits the acoustic signal. The transmitting transducer is a carbon nanotube transmitting transducer as shown in FIG. 2 or FIG. 9.

Figure 2:
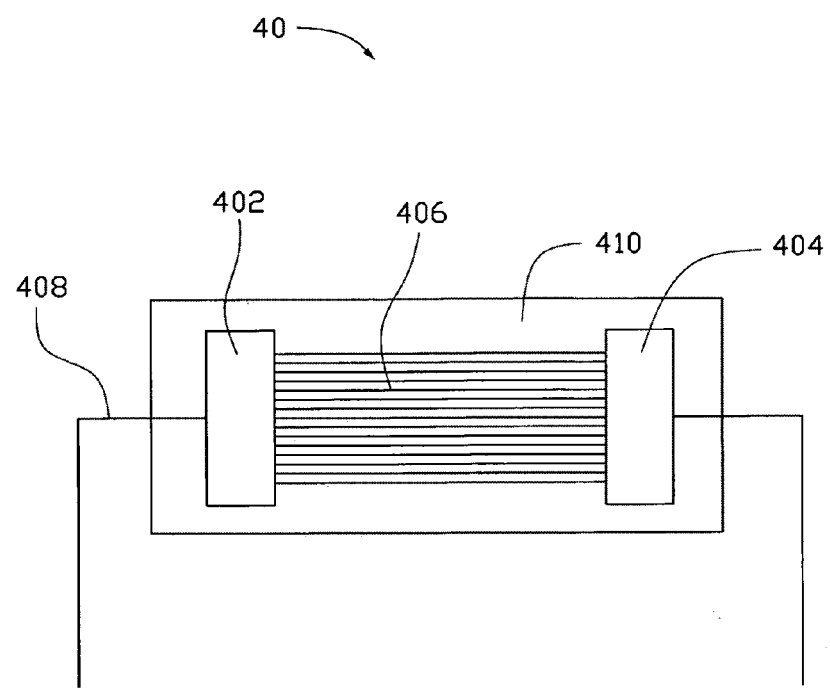
FIG. 2 is a schematic view of one embodiment of a planar carbon nanotube transmitting transducer.

Referring to FIG. 2, one embodiment of a planar carbon nanotube transmitting transducer 40 includes a first electrode 402, a second electrode 404, and an acoustic element 406. The first electrode 402 and the second electrode 404 are located apart from each other. The acoustic element 406 is electrically connected to the first electrode 402 and the second electrode 404. Furthermore, the transducer 40 can include a supporter 410. The first electrode 402, the second electrode 404, and the acoustic element 406 are located on the supporter 410.

The acoustic element 406 can be a carbon nanotube structure. The carbon nanotube structure includes a plurality of carbon nanotubes uniformly distributed therein, and the carbon nanotubes therein can be joined by van der Waals attractive force therebetween. The carbon nanotube structure can be a substantially pure structure of the carbon nanotubes. The carbon nanotubes can be used to form many different structures and provide a large specific surface area. The heat capacity per unit area of the carbon nanotube structure can be less than $2 \times 10^{-4}$ J/m$^2$*K. In one embodiment, the heat capacity per unit area of the carbon nanotube structure is less than $1.7 \times 10^{-6}$ J/m$^2$*K.

The carbon nanotubes in the carbon nanotube structure can be arranged orderly or disorderly. The term 'disordered carbon nanotube structure' includes, but is not limited to, a structure where the carbon nanotubes are arranged along many different directions, and the aligning directions of the carbon nanotubes are random. The number of the carbon nanotubes arranged along each different direction can be almost the same (e.g. uniformly disordered). The disordered carbon nanotube structure can be isotropic, namely the carbon nanotube film has properties identical in all directions of the carbon nanotube structure. The carbon nanotubes in the disordered carbon nanotube structure can be entangled with each other. The carbon nanotubes in the carbon nanotube structure can be selected from single-walled, double-walled, or multi-walled carbon nanotubes.

The carbon nanotube structure can be an ordered carbon nanotube structure. The term 'ordered carbon nanotube structure' includes, but is not limited to, a structure where the carbon nanotubes are arranged in a consistently systematic manner. For example, the carbon nanotubes are arranged approximately along a same direction and/or have two or more sections within each of which the carbon nanotubes are arranged approximately along a same direction (i.e., different sections can have different directions). The carbon nanotubes in the carbon nanotube structure can be selected from single-walled, double-walled, or multi-walled carbon nanotubes.

The carbon nanotube structure can be a carbon nanotube film structure with a thickness ranging from about 0.5 nanometer (nm) to about 1 millimeter (mm). The carbon nanotube film structure can include at least one carbon nanotube film. If the acoustic element 406 includes a plurality of carbon nanotube films, the plurality of carbon nanotube films can be located coplanar. The carbon nanotube structure can also be a linear carbon nanotube structure with a diameter ranging from about 0.5 nm to about 1 mm. If the acoustic element 406 includes a single linear carbon nanotube structure, the single linear carbon nanotube structure can be folded or winded to form a planar structure. If the acoustic element 406 includes a plurality of linear carbon nanotube structures, the plurality of linear carbon nanotube structures can be in parallel, crossed with each other, or woven together to form a planar structure. The carbon nanotube structure can also be a combination of the carbon nanotube film structure and the linear carbon nanotube structure. It is understood that any carbon nanotube structure described can be used with all embodiments. It is also understood that any carbon nanotube structure may or may not employ the use of a support structure.

In one embodiment, the carbon nanotube film structure includes at least one drawn carbon nanotube film. The carbon nanotube drawn film includes a plurality of carbon nanotubes that can be arranged substantially parallel to a surface of the carbon nanotube drawn film. A large number of the carbon nanotubes in the carbon nanotube drawn film can be oriented along a preferred orientation, meaning that a large number of the carbon nanotubes in the carbon nanotube drawn film are arranged substantially along the same direction. An end of one carbon nanotube adjoins another end of an adjacent carbon nanotube arranged substantially along the same direction, by van der Waals attractive force. A small number of the carbon nanotubes are randomly arranged in the carbon nanotube drawn film, and has a small if not negligible effect on the larger number of the carbon nanotubes in the carbon nanotube drawn film arranged substantially along the same direction. The carbon nanotube film is capable of forming a freestanding structure. The term "freestanding structure" may be defined as a structure that does not have to be supported by a substrate. For example, a freestanding structure can sustain its weight when it is hoisted by a portion thereof without any significant damage to its structural integrity. If the carbon nanotube drawn film is placed between two separate supporters, a portion of the carbon nanotube drawn film, not in contact with the two supporters, would be suspended between the two supporters and yet maintain structural integrity. The successive carbon nanotubes joined end to end by van der Waals attractive force realizes the freestanding structure of the carbon nanotube drawn film.

Figure 3:
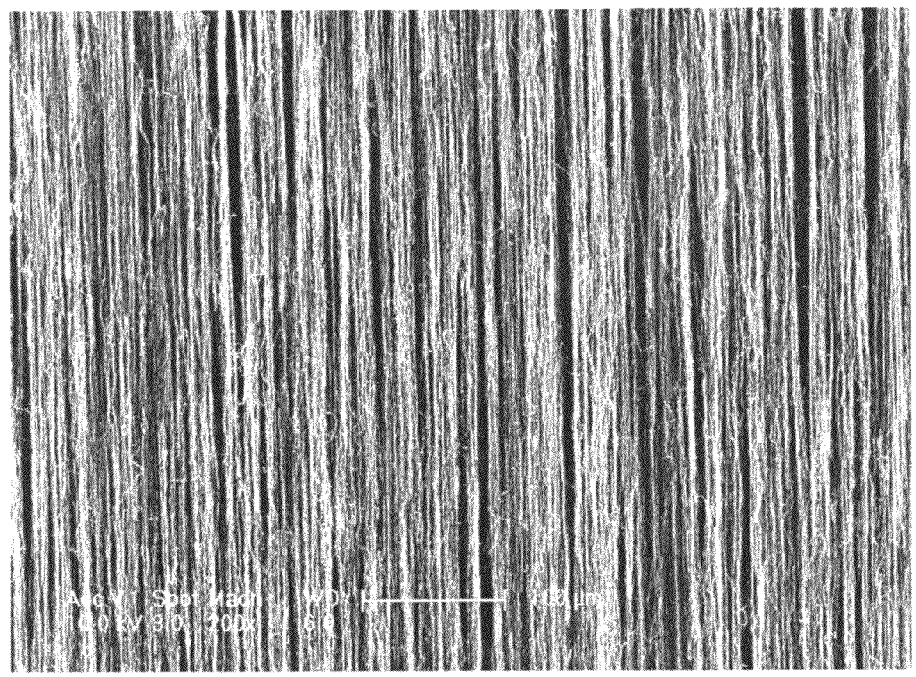
FIG. 3 is a Scanning Electron Microscope (SEM) image of a drawn carbon nanotube film.

It can be appreciated that some variation can occur in the orientation of the carbon nanotubes in the carbon nanotube drawn film as can be seen in FIG. 3. Microscopically, the carbon nanotubes oriented substantially along the same direction may not be perfectly aligned in a straight line, and some curve portions may exist. Moreover, some carbon nanotubes located substantially side by side and oriented along the same direction in contact with each other cannot be excluded.

Figure 4:
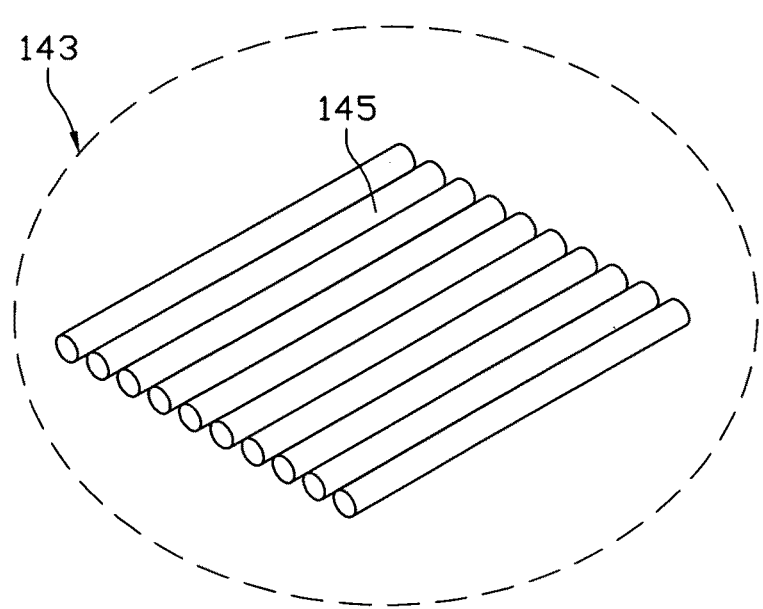
FIG. 4 is a schematic view of a carbon nanotube segment in the drawn carbon nanotube film of FIG. 3.

More specifically, referring to FIG. 4, the carbon nanotube drawn film includes a plurality of successively oriented carbon nanotube segments 143 joined end to end by van der Waals attractive force therebetween. Each carbon nanotube segment 143 includes a plurality of carbon nanotubes 145 substantially parallel to each other, and joined by van der Waals attractive force therebetween. The carbon nanotube segments 143 can vary in width, thickness, uniformity and shape. The carbon nanotubes 145 in the carbon nanotube drawn film 143 are also substantially oriented along a preferred orientation.

The carbon nanotube film structure of the acoustic element 406 can include at least two stacked drawn carbon nanotube films. In other embodiments, the carbon nanotube structure can include two or more coplanar carbon nanotube films, and can include layers of coplanar carbon nanotube films. Additionally, when the carbon nanotubes in the carbon nanotube film are aligned along one preferred orientation (e.g., the drawn carbon nanotube film), an angle can exist between the orientation of carbon nanotubes in adjacent films, whether stacked or adjacent. Adjacent carbon nanotube films can be joined by only the van der Waals attractive force therebetween. The number of the layers of the carbon nanotube films is not limited by the length of the carbon nanotube structure. However, the thicker the carbon nanotube structure, the smaller specific surface area. An angle between the aligned directions of the carbon nanotubes in two adjacent carbon nanotube films can range from about 0 degrees to about 90 degrees. When the angle between the aligned directions of the carbon nanotubes in adjacent stacked carbon nanotube films is larger than 0 degrees, a microporous structure is defined by the carbon nanotubes in the acoustic element 406. The carbon nanotube structure in an embodiment employing these films will have a plurality of micropores. Stacking the carbon nanotube films will also add to the structural integrity of the carbon nanotube structure. In some embodiments, the carbon nanotube structure is a freestanding structure.

In another embodiment, the carbon nanotube film structure can include at least a pressed carbon nanotube film. The pressed carbon nanotube film can be a freestanding carbon nanotube film. The carbon nanotubes in the pressed carbon nanotube film are arranged along a same direction or along different directions. The carbon nanotubes in the pressed carbon nanotube film can rest upon each other. Adjacent carbon nanotubes are attracted to each other and joined by van der Waals attractive force. An angle between a primary alignment direction of the carbon nanotubes and a surface of the pressed carbon nanotube film is 0 degrees to approximately 15 degrees. The greater the pressure applied, the smaller the angle formed. When the carbon nanotubes in the pressed carbon nanotube film are arranged along different directions, the carbon nanotube structure can be isotropic. Here, "isotropic" means the carbon nanotube film has properties identical in all directions parallel to a surface of the carbon nanotube film. The thickness of the pressed carbon nanotube film ranges from about 0.5 nm to about 1 mm.

In another embodiment, the carbon nanotube film structure includes a flocculated carbon nanotube film. The flocculated carbon nanotube film can include a plurality of long, curved, disordered carbon nanotubes entangled with each other. Further, the flocculated carbon nanotube film can be isotropic. The carbon nanotubes can be substantially uniformly dispersed in the carbon nanotube film. Adjacent carbon nanotubes are acted upon by van der Waals attractive force to form an entangled structure with micropores defined therein. It is understood that the flocculated carbon nanotube film is very porous. Sizes of the micropores can be less than 10 μm. The porous nature of the flocculated carbon nanotube film will increase specific surface area of the carbon nanotube structure. Further, due to the carbon nanotubes in the carbon nanotube structure being entangled with each other, the carbon nanotube structure employing the flocculated carbon nanotube film has excellent durability, and can be fashioned into desired shapes with a low risk to the integrity of the carbon nanotube structure. The thickness of the flocculated carbon nanotube film can range from about 0.5 nm to about 1 mm.

In other embodiments, the linear carbon nanotube structures, including carbon nanotube wires and/or carbon nanotube cables, can be used.

Figure 5:
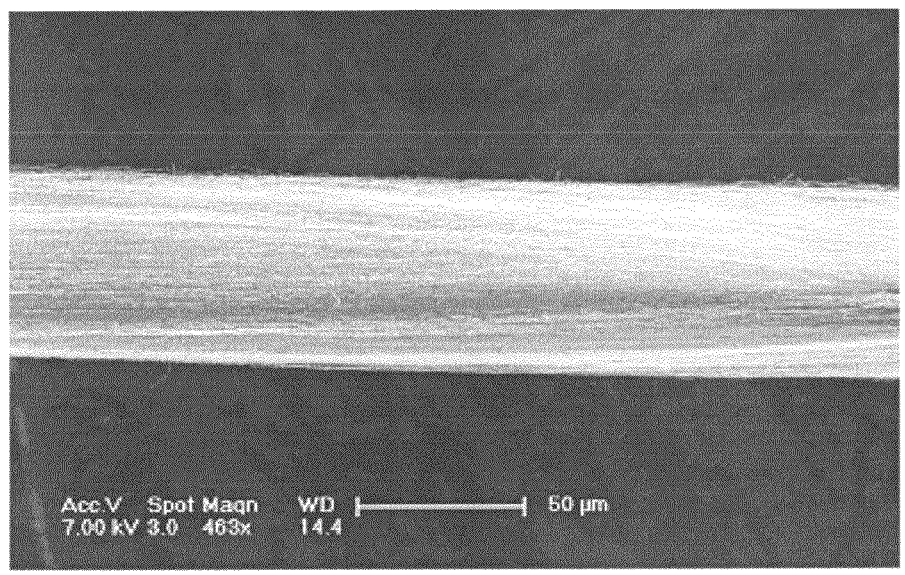
FIG. 5 is an SEM image of an untwisted carbon nanotube wire.

The carbon nanotube wire can be untwisted or twisted. Treating the drawn carbon nanotube film with a volatile organic solvent can create the untwisted carbon nanotube wire. In one embodiment, the organic solvent is applied to soak the entire surface of the drawn carbon nanotube film. During the soaking, adjacent parallel carbon nanotubes in the drawn carbon nanotube film bundle together, due to the surface tension of the organic solvent as it volatilizes, and thus, the drawn carbon nanotube film is shrunk into untwisted carbon nanotube wire. Referring to FIG. 5, the untwisted carbon nanotube wire includes a plurality of carbon nanotubes substantially oriented along a same direction (i.e., a direction along the length of the untwisted carbon nanotube wire). The carbon nanotubes are substantially parallel to the axis of the untwisted carbon nanotube wire. More specifically, the untwisted carbon nanotube wire includes a plurality of successive carbon nanotube segments joined end to end by van der Waals attractive force therebetween. Each carbon nanotube segment includes a plurality of carbon nanotubes substantially parallel to each other, and joined by van der Waals attractive force therebetween. The carbon nanotube segments can vary in width, thickness, uniformity and shape. Length of the untwisted carbon nanotube wire can be arbitrarily set as desired. A diameter of the untwisted carbon nanotube wire ranges from about 0.5 nm to about 100 μm.

Figure 6:
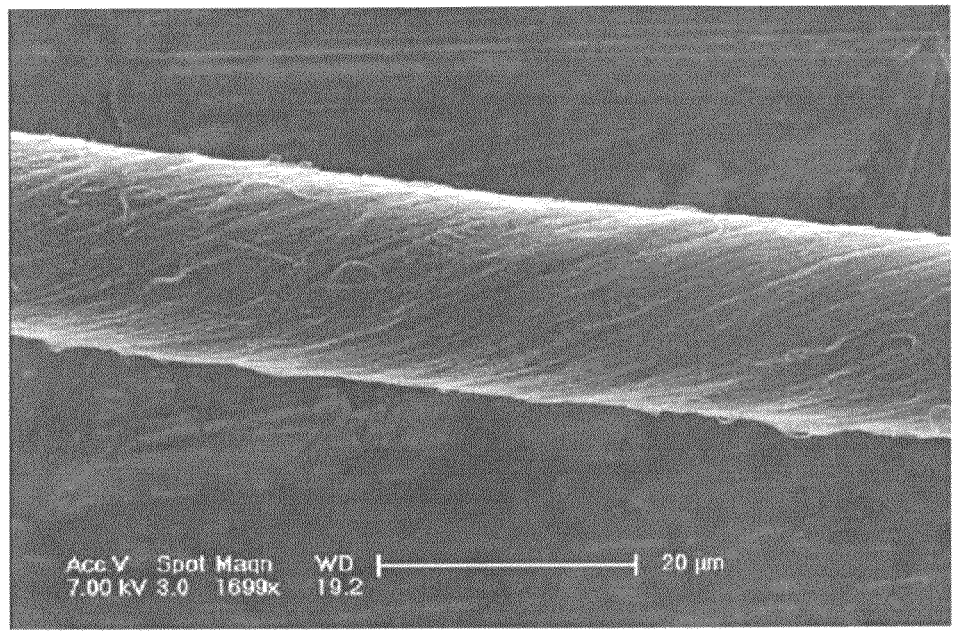
FIG. 6 is an SEM image of a twisted carbon nanotube wire.

The twisted carbon nanotube wire can be formed by twisting a drawn carbon nanotube film using a mechanical force to turn the two ends of the drawn carbon nanotube film in opposite directions. Referring to FIG. 6, the twisted carbon nanotube wire includes a plurality of carbon nanotubes helically oriented around an axial direction of the twisted carbon nanotube wire. More specifically, the twisted carbon nanotube wire includes a plurality of successive carbon nanotube segments joined end to end by van der Waals attractive force therebetween. Each carbon nanotube segment includes a plurality of carbon nanotubes substantially parallel to each other, and joined by van der Waals attractive force therebetween. The length of the carbon nanotube wire can be set as desired. A diameter of the twisted carbon nanotube wire can be from about 0.5 nm to about 100 μm. Further, the twisted carbon nanotube wire can be treated with a volatile organic solvent after being twisted. After being soaked by the organic solvent, the adjacent paralleled carbon nanotubes in the twisted carbon nanotube wire bundle together, due to the surface tension of the organic solvent when the organic solvent volatilizes. The specific surface area of the twisted carbon nanotube wire will decrease, while the density and strength of the twisted carbon nanotube wire will increase.

The carbon nanotube cable includes two or more carbon nanotube wires. The carbon nanotube wires in the carbon nanotube cable can be, twisted or untwisted. In an untwisted carbon nanotube cable, the carbon nanotube wires are substantially parallel with each other. In a twisted carbon nanotube cable, the carbon nanotube wires are twisted with each other.

The first electrode 402 and the second electrode 404 are electrically connected to the acoustic element 406. The first electrode 402 is kept isolated from the second electrode 404 to prevent a short circuit between the two electrodes 402, 404. The shape of the first electrode 402 or the second electrode 404 is not limited and can be lamellar, rod, wire, block among other shapes. In one embodiment shown in FIG. 2, the first electrode 402 and the second electrode 404 are both lamellar and substantially parallel with each other. The material of the first electrode 402 and the second electrode 404 can be selected from metals, conductive resins, carbon nanotube structure, or any other suitable materials. In one embodiment, each of the first electrode 402 and the second electrode 404 is a copper sheet and the supporter 410 is a glass plate.

The transducer 40 can work in a gas medium or a liquid medium. The carbon nanotube structure can have a large area for causing a pressure oscillation in the medium by the temperature waves generated by the transducer 40, because the carbon nanotube structure comprises a plurality of carbon nanotubes and has a small heat capacity per unit area (less than $2\times10^{-4}$ $J/m^2*K$). In use, when signals (e.g., electrical signals, with variations in the application of the signal and/or strength) are sent to the carbon nanotube structure of the transducer 40, heat is produced in the carbon nanotube structure according to the variations of the signal and/or signal strength, and temperature waves, which are propagated in a medium, are obtained. The temperature waves produce pressure waves in the medium, resulting in acoustic signal generation. In this process, it is the thermal expansion and contraction of the medium in the vicinity of the transducer 40 that produces acoustic signals. This is distinct from the mechanism of the conventional loudspeaker, in which pressure waves are created by the mechanical movement of the diaphragm. If the input signals are electrical signals, the operating principle of the transducer 40 is an "electrical-thermal-sound" conversion. If the input signals are optical signals, the operation principle of the transducer 40 is an "optical-thermal-sound" conversion. Energy of the optical signals can be absorbed by the transducer 40 and the resulting energy will then be radiated as heat. This heat causes detectable acoustic signals due to pressure variation in the medium. The acoustic signal produced by the transducer 40 has excellent directional properties and can replace traditional transducer arrays.

Figure 7:
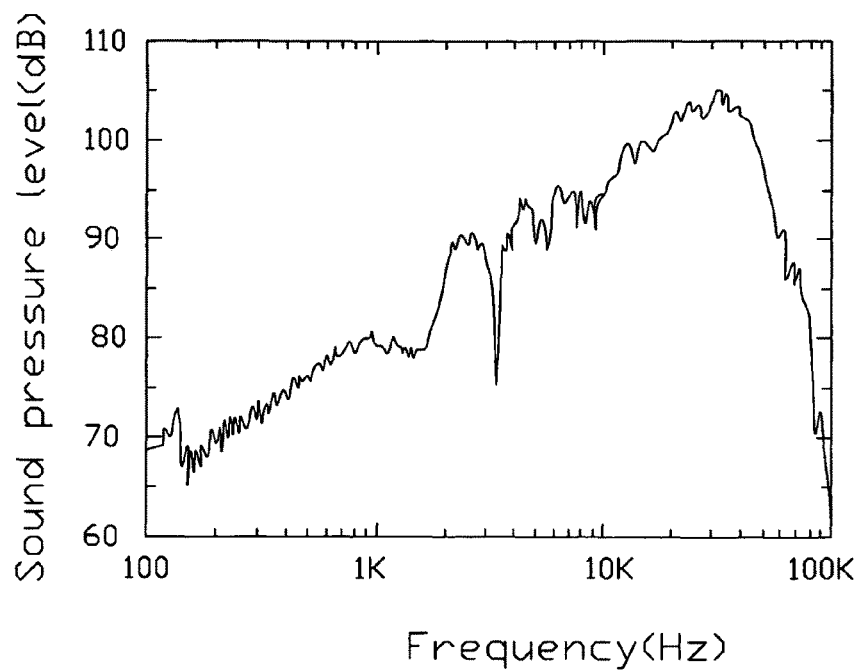
FIG. 7 is a frequency response curve in air of one embodiment of the planar carbon nanotube transmitting transducer.

When the transducer 40 is used in a gas medium, the frequency response range of the transducer 40 can range from about 1 Hz to about 100 KHz. In one tested embodiment, the medium is air, the acoustic element 406 is a single drawn carbon nanotube film with length of 30 mm and width of 30 mm, the voltage supplied is 50 volts, and a microphone (not shown) is located about 5 cm from the acoustic element 406. The microphone is used to measure the performance of the transducer 40. As shown in FIG. 7, the transducer 40 has a wide frequency response range and a high sound pressure level in air. The sound pressure level of the sound waves generated by the transducer 40 in air can range from about 65 decibels (dB) to about 105 dB. The frequency response range of the transducer 40 in air ranges from about 100 Hz to about 100 KHz. The distortion of the sound transmitted by the transducer 40 in a range from about 500 Hz to about 40 KHz is less than 3%. Thus, an ultrasonic wave with frequency above 10 KHz can be transmitted.

Figure 8:
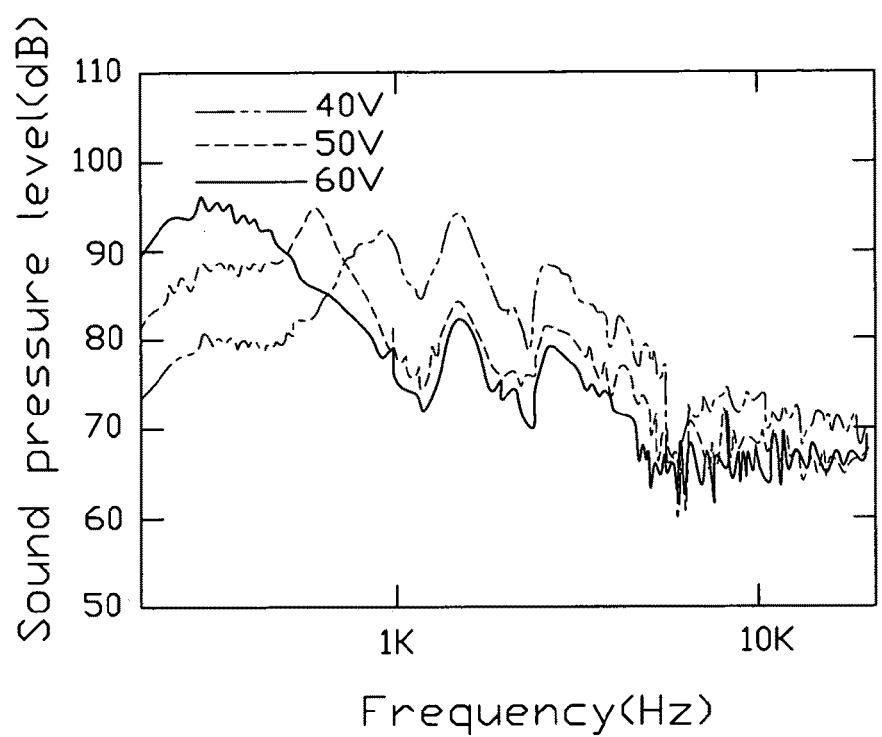
FIG. 8 is a frequency response curve in a liquid of one embodiment of the planar carbon nanotube transmitting transducer.

When the transducer 40 is used in a liquid medium, the transducer 40 can be submerged in the liquid medium. The electrical resistivity of the liquid medium should be higher than $2 \times 10^{-2}$ $\Omega$*M, to maintain enough electro-heat conversion efficiency. The liquid medium can be a nonelectrolyte solution, pure water, seawater, freshwater, organic solvents, or combinations thereof. In one testing embodiment, the liquid medium is pure water with an electrical resistivity of about $1.5 \times 10^{7}$ $\Omega$*M. It is understood that pure water has a relatively higher specific heat capacity to dissipate the heat of the carbon nanotube structure rapidly. The acoustic element 406 is a carbon nanotube structure having 16 layers of the drawn carbon nanotube film with a length of 30 mm and a width of 30 mm, and the angle between the aligned directions of the carbon nanotubes in two adjacent drawn carbon nanotube films is about 0 degrees. The entire carbon nanotube structure is totally submerged in the pure water to a depth of about 1 mm. To obtain the frequency response curve of the transducer 40, alternating currents of about 40 volts, then about 50 volts, and then about 60 volts are applied to the carbon nanotube structure. A microphone is placed above and near the surface of the pure water at a distance of about cm from the transducer 40. As shown in FIG. 8, the sound pressure level of the sound waves generated by the transducer 40 can range from about 75 dB to about 95 dB. The frequency response range of the transducer 40 can range from about 1 Hz to about 100 KHz.

The transducer 40 can be installed on a rotatable device (not shown). The rotatable device can adjust which way the transducer 40 faces.

Alternatively, the transducer 40 can include a plurality of first electrodes 402 and a plurality of second electrodes 404. The plurality of first electrodes 402 and the plurality of second electrodes 404 are located alternately. The plurality of first electrodes 402 are electrically connected in parallel, and the plurality of second electrodes 404 are electrically connected in parallel. The parallel connections in the acoustic element 406 provide lower resistance, so input voltage to the acoustic element 406 can be lowered, thus the sound pressure of the acoustic element 406 can be increased while maintaining the same voltage.

It is understood that when the plurality of first electrodes 402 and the plurality of second electrodes 404 are alternately located in different planes, the acoustic element 406 can surround the plurality of first electrodes 402 and the plurality of second electrodes 404 to form a three-dimensional structure. Thus, a cubic carbon nanotube transmitting transducer (as shown in FIG. 9) can be obtained.

Referring to FIG. 9, one embodiment of a cubic carbon nanotube transmitting transducer 50 includes two first electrodes 502, two second electrodes 504 and an acoustic element 506. The two first electrodes 502 and the two second electrodes 504 are rod-shaped metal electrodes. The two first electrodes 502 and the two second electrodes 504 are alternately spaced apart in different planes. The acoustic element 506 is a carbon nanotube structure and surrounds the two first electrodes 502 and the two second electrodes 504 to form a three-dimensional structure. As shown in the FIG. 9, the two first electrodes 502 are electrically connected in parallel. The two second electrodes 504 are also electrically connected in parallel. The transducer 50 includes different surfaces toward different orientations, and can transmit the acoustic signals toward different orientations simultaneously.

It is understood that the two first electrodes 502 and the two second electrodes 504 can serve as a supporter for the acoustic element 506 to form a three-dimensional structure. Thus, the transducer 50 can include only one first electrode 502, only one second electrode 504 and at least one rod-shaped supporter, such as two rod-shaped supporter. The sole first electrode 502, sole second electrode 504 and the two rod-shaped supporter can be located in different planes. The acoustic element 506 surrounds the first electrode 502, the second electrode 504 and the rod-shaped supporter to form a three-dimensional structure.

The receiver 308 can include one or more receiving transducer(s), such as a receiving transducer array. The receiving transducer can be a piezoelectric transducer made of piezoelectric ceramic, a giant magnetostrictive transducer made of rare-earth alloy or an electrostrictive transducer made of ferroelectric material. The receiving transducer array can be a linear array or matrix. In one embodiment, the receiver 308 is a receiving transducer array including a plurality of piezoelectric transducers made of piezoelectric ceramic, arranged in an 8×8 matrix (8 rows and 8 receiving transducers in each row). The frequency of the receiver 308 can range from about 30 KHz to about 1200 KHz. The receiver 308 receives the reflected acoustic signals and transduces the acoustic signals to electrical signals.

Figure 10:
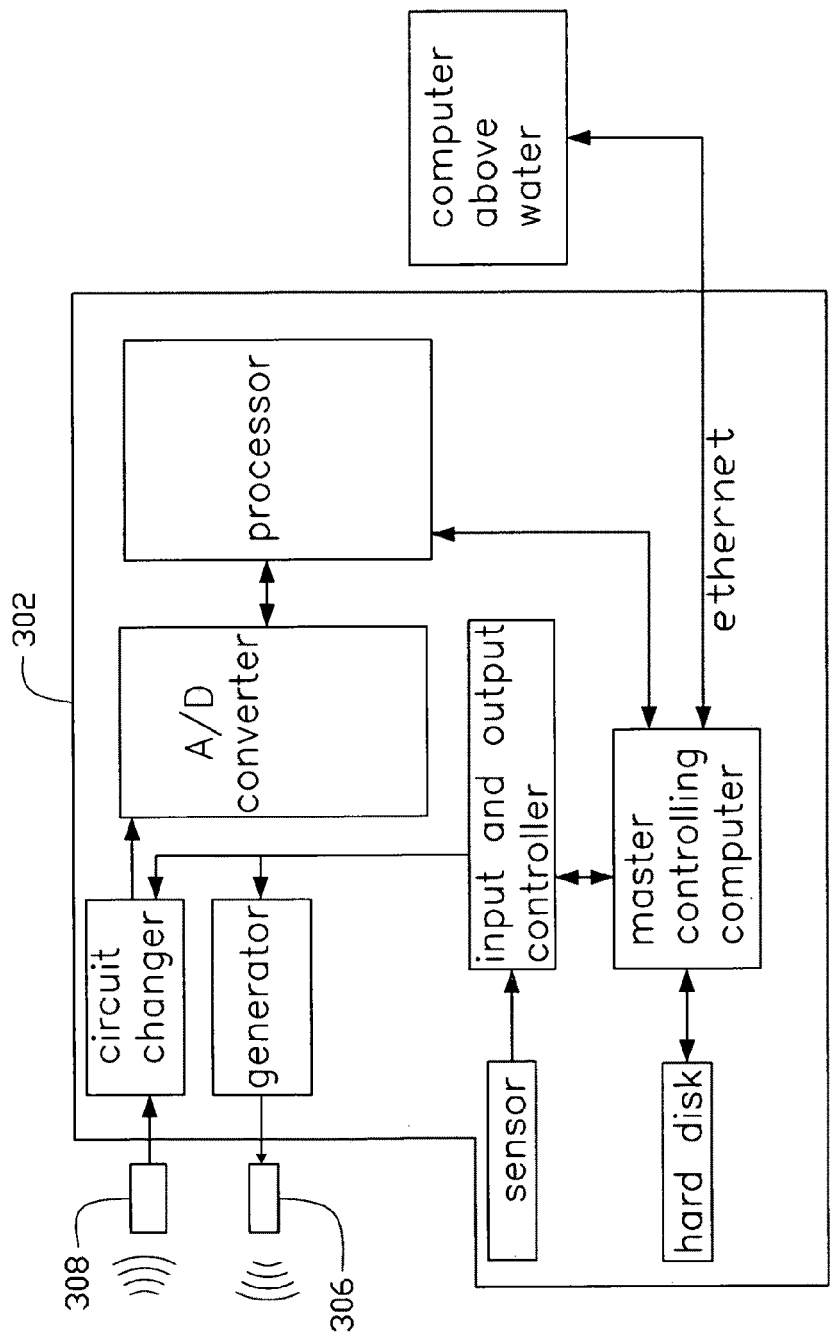
FIG. 10 is a schematic view of one embodiment of an electronic cabinet showing the various components of an electronic cabinet of the active sonar system of FIG. 1.

Referring to FIG. 10, the electronic cabinet 302 includes a master process control computer, a hard disk, a sensor, an input and output controller, a processor, an analog to digital (A/D) converter, a generator and a circuit changer. The A/D converter can be a multi-channel A/D converter. The sensor can be a posture sensor and/or temperature sensor. The generator is connected to the transmitter 306. The circuit changer is connected to the receiver 308. The generator and the circuit changer are connected to the master process control computer via the input and output controllers. The circuit changer is connected to the processor via the A/D converter. The hard disk is connected to the master process control computer. The sensor is connected to the input and output controllers. When the active sonar system 30 works underwater, it can be connected to a computer above water via an ethernet.

The work process of the active sonar system 30 is described as follows. A gate signal is sent by the master process control computer to the generator through the input and output controllers. A high power electric pulse signal is generated by the generator after the generator receives the gate signal. The transmitter 306 is driven by the electric pulse signal to transmit an acoustic pulse signal. After the transmitter 306 transmits the acoustic pulse signal, the master process control computer commands the processor to start up the A/D converter. The master process control computer sends a time-gain-compensation (TGC) signal through the input and output controllers at the same time. The acoustic pulse signal is reflected from the target 310 as an acoustic echo and detected by the receiver 308. The acoustic echo detected by the receiver 308 can be amplified, filtered and demodulated by the circuit changer and sent to the processor as a digital signal through the A/D converter. The digital signal is processed by the processor and the result data is sent to the master process control computer and saved in the hard disk. When the sensor receives a signal, a data is sent by the sensor to the master process control computer and saved in the hard disk. Furthermore, the master process control computer can analyze the data sent back from the sensor and send a gate signal again.

Figure 11:
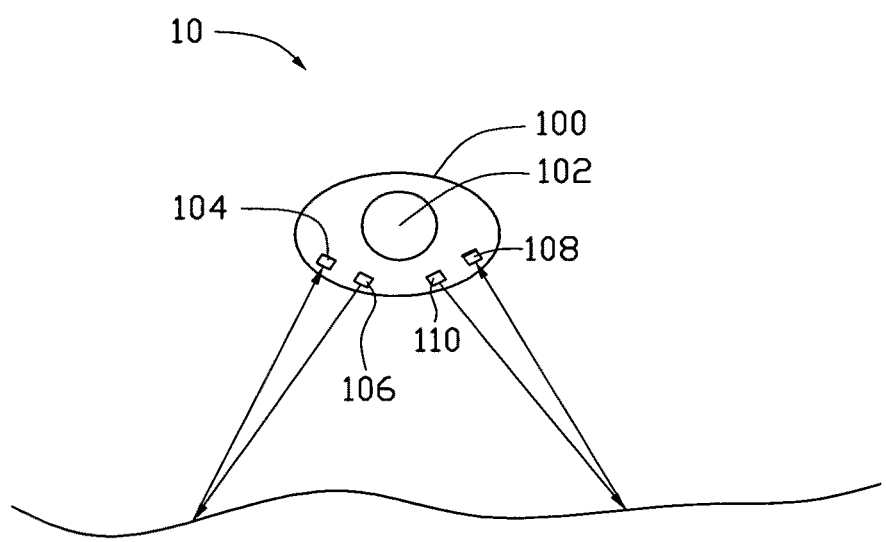
FIG. 11 is a schematic view of another embodiment of an active sonar system having a carbon nanotube transmitting transducer array.

Referring to FIG. 11, an active sonar system 10 of another embodiment includes a first transmitter 106, a first receiver 104, a second transmitter 110, a second receiver 108, an electronic cabinet 102 and an underwater carrier 100. The active sonar system 10 is similar to the active sonar system 30. The difference is that the active sonar-system 10 includes two transmitters 106, 110 and two receivers 104, 108 located on different positions of the underwater carrier 100 in pairs, and the transmitters 106, 110 include a carbon nanotube transmitting transducer array 20 as shown in FIG. 12.

Figure 12:
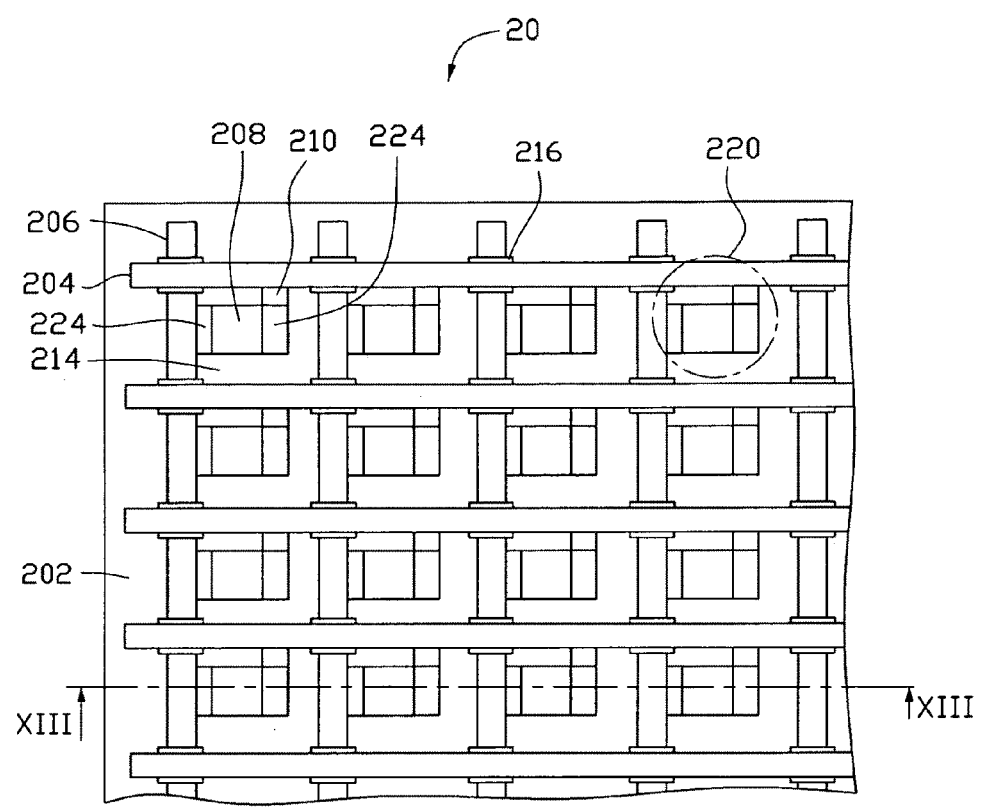
FIG. 12 is a schematic view of one embodiment of the carbon nanotube transmitting transducer array of the active sonar system of FIG. 11.
Figure 13:
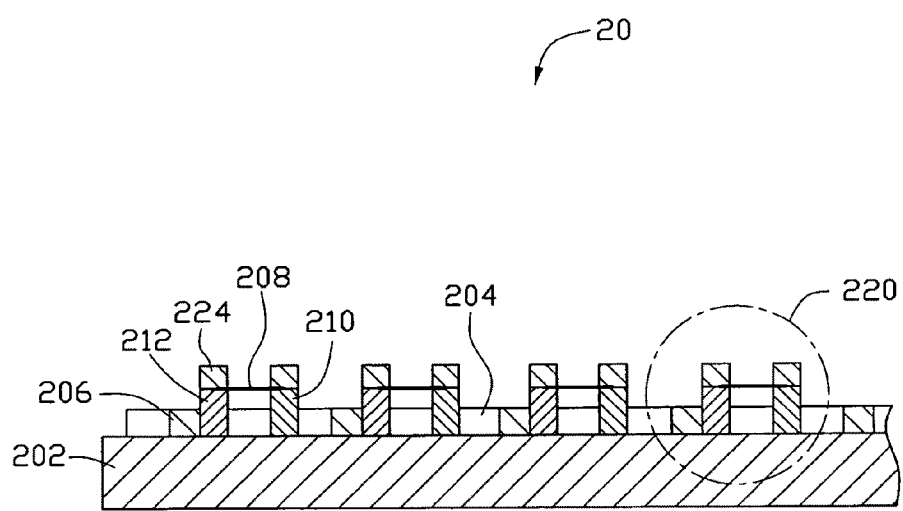
FIG. 13 is a schematic, cross-sectional view, along a line XIII-XIII of FIG. 12.

Referring to FIGS. 12 and 13, one embodiment of a carbon nanotube transmitting transducer array 20 includes a substrate 202, a plurality of first electrode down-leads 204, a plurality of second electrode down-leads 206, and a plurality of carbon nanotube transmitting transducers 220. The first electrode down-leads 204 are parallely positioned on the substrate 202. The second electrode down-leads 206 are parallely positioned on the substrate 202. The first electrode down-leads 204 cross the second electrode down-leads 206. A grid is defined by the first electrode down-leads 204 and the second electrode down-leads 206. Each two adjacent first electrode down-leads and each two adjacent second electrode down-leads of the grid define a plurality of cells 214. One carbon nanotube transmitting transducer 220 is located in each cell 214.

The substrate 202 can be made of insulative material. The insulative material can be ceramics, glass, resins, quartz or combinations thereof. The size and the thickness of the substrate 202 can be chosen according to need.

The first electrode down-leads 204 can be located equidistantly. A distance between adjacent two first electrode down-leads 204 can range from about 50 μm to about 2 cm. The second electrode down-leads 206 can be located equidistantly. A distance between adjacent two second electrode down-leads 206 can range from about 50 μm to about 2 cm. In one embodiment, the first electrode down-leads 204 and the second electrode down-leads 206 are set at an angle with respect to each other. The angle can range from about 10 degrees to about 90 degrees. In one embodiment, the angle is about 90 degrees.

The first and second electrode down-leads 204, 206 are made of conductive material such as metal or conductive slurry. In one embodiment, the first electrode down-leads 204 and the second electrode down-leads 206 are formed by applying conductive slurry on the substrate 202 using a printing process. The conductive slurry can comprise metal powder, glass powder, and binder. The metal powder can be silver powder. The glass powder has low melting point. The binder can be terpineol or ethyl cellulose (EC). The conductive slurry can include from about 50% to about 90% (by weight) of the metal powder, from about 2% to about 10% (by weight) of the glass powder, and from about 8% to about 40% (by weight) of the binder. In one embodiment, each of the first electrode down-leads 204 and the second electrode down-leads 206 has a width ranging from about 30 μm to about 100 μm and a thickness ranging from about 10 μm to about 50 μm. However, it is noted that dimensions of each of the first electrode down-leads 204 and the second electrode down-leads 206 can vary corresponding to dimensions of each cell 214.

Furthermore, the array 20 can include a plurality of insulators 216 sandwiched between the first electrode down-leads 204 and the second electrode down-leads 206 to avoid short-circuits. The insulators 216 are located at every intersection of the first electrode down-leads 204 and the second electrode down-leads 206 and provide electrical insulation therebetween. In one embodiment, the insulator 216 is a dielectric insulator.

Each of the carbon nanotube transmitting transducers 220 can include a first electrode 210, a second electrode 212, and an acoustic element 208. A distance between the first electrode 210 and the second electrode 212 can be about 10 μm to about 2 cm. The acoustic element 208 is located between, and electrically connected to the first electrode 210 and the second electrode 212. The acoustic element 208 can be spaced from the substrate 202 to avoid heat generated by the acoustic element 208 from being absorbed by the substrate 202. A distance between the acoustic element 208 and the substrate 202 can range from about 10 μm to about 2 cm. In one embodiment, the distance between the acoustic element 208 and the substrate 202 is about 1 mm.

The first electrodes 210 of the carbon nanotube transmitting transducers 220 are electrically connected to the first electrode down-lead 204. The second electrodes 212 of the carbon nanotube transmitting transducers 220 are electrically connected to the second electrode down-lead 206.

Each of the first electrodes 210 can have a length ranging from about 20 μm to about 15 mm, a width ranging from about 30 μm to 10 mm and a thickness ranging from about 10 μm to about 500 μm. Each of the second electrodes 212 has a length ranging from about 20 μm to about 15 mm, a width ranging from about 30 μm to about 10 mm and a thickness ranging from about 10 μm to about 500 μm. In one embodiment, the first electrode 210 has a length ranging from about 100 μm to about 700 μm, a width ranging from about 50 μm to about 500 μm and a thickness ranging from about 20 μm to about 100 μm. The second electrode 212 has a length ranging from about 100 μm to about 700 μm, a width ranging from about 50 μm to about 500 μm and a thickness ranging from about 20 μm to about 100 μm.

The first electrodes 210 and the second electrodes 212 can be made of metal or conductive slurry. In one embodiment, the first electrode 210 and the second electrode 212 are formed by printing the conductive slurry on the substrate 202. Similar to the acoustic element 406 discussed above, the acoustic element 208 also includes a carbon nanotube structure.

Furthermore, the array 20 can include a fixing element 224 located on the first electrode 210 and the second electrode 212. The fixing element 224 fixes the acoustic element 208 on the first electrode 210 and the second electrode 212. In one embodiment, the material, shape, and/or size of the fixing element 224 is the same as the second electrode 212.

In one embodiment, the substrate 202 is a quartz substrate with a thickness of 1 mm, an edge length of 48 mm, and the carbon nanotube transmitting transducers 220 arranged in an 8×8 matrix (8 rows, 8 carbon nanotube transmitting transducers 220 in each row). The acoustic element 208 is a single drawn carbon nanotube film with length of 800 μm and width of 300 μm. The carbon nanotubes of the drawn carbon nanotube film extend from the first electrode 210 to the second electrode 212. The drawn carbon nanotube film can be fixed on a surface of the first electrode 210 and the second electrode 212 by, for example, a conductive adhesive (not shown), such as silver adhesive.

Furthermore, a shell (not shown) can be located on a surface of the substrate 202 to cover the electrode down-leads 204, 206, the electrodes 210, 212 and the acoustic elements 208. The material of the shell can be metal, alloy or glass. The shell can further define a plurality of holes to allow acoustic signal get out. The shell can protect the acoustic element 208 from outside contaminants. The shell is an optional structure and can be omitted.

In use, a driving circuit (not shown) can be included. Each acoustic element 208 of the array 20 can be controlled by the driving circuit to transmit acoustic signal independently. A sound wave with different phase can be transmitted by the carbon nanotube transmitting transducers 220 in the same row or column. The power of the array 20 can be increased when all the carbon nanotube transmitting transducers 220 work together.

The active sonar systems 30, 10 have the following advantages. Firstly, the active sonar systems 30, 10 have simple structure because of the carbon nanotube transmitting transducer 40, 50, 220, thus a special device for supplying an electric field or magnetic field can be omitted. Secondly, the precision of the orientation of the active sonar systems 30, 10 is increased because the acoustic signal produced by the carbon nanotube transmitting transducer has excellent directional property.

The active sonar systems 30, 10 can be applied in torpedo guidance, fish and other marine detection, ocean prospecting, ship navigation or underwater working.

It is to be understood that the above-described embodiments are intended to illustrate rather than limit the disclosure. Variations may be made to the embodiments without departing from the spirit of the disclosure as claimed. The above-described embodiments illustrate the disclosure but do not restrict the scope of the disclosure.

What is claimed is:

1. An active sonar system comprising:
   at least one transmitter to transmit an acoustic signal, the at least one transmitter comprising at least one carbon nanotube transmitting transducer submerged in a liquid medium, the at least one carbon nanotube transmitting transducer comprising at least one first electrode, at least one second electrode, and a carbon nanotube structure configured to generate sound by heating the liquid medium to cause a pressure oscillation in the liquid medium, the carbon nanotube structure being electrically connected to the at least one first electrode and the at least one second electrode;
   at least one receiver to receive a reflected acoustic signal; and
   an electronic cabinet to control the at least one transmitter to transmit the acoustic signal and the at least one receiver to receive the reflected acoustic signal.

2. The active sonar system of claim 1, wherein the carbon nanotube structure is a freestanding structure.

3. The active sonar system of claim 1, wherein the carbon nanotube structure is a carbon nanotube film, and a heat capacity per unit area of the carbon nanotube film is less than $2 \times 10^{-4}$ J/m$^2$*K.

4. The active sonar system of claim 1, wherein the carbon nanotube structure is a carbon nanotube film structure.

5. The active sonar system of claim 4, wherein the carbon nanotube film structure comprises a plurality of carbon nanotubes substantially oriented along a same direction.

6. The active sonar system of claim 5, wherein the carbon nanotubes of the carbon nanotube film structure are joined end-to-end by Van der Waals attractive force therebetween.

7. The active sonar system of claim 6, wherein the carbon nanotubes of the carbon nanotube film structure extend from the at least one first electrode to the at least one second electrode.

8. The active sonar system of claim 4, wherein the carbon nanotube film structure comprises a plurality of carbon nanotubes entangled with each other.

9. The active sonar system of claim 4, wherein the carbon nanotube film structure comprises a plurality of carbon nanotubes resting upon each other, an angle between an alignment direction of the carbon nanotubes and a surface of the carbon nanotube film structure ranges from about 0 degrees to about 15 degrees.

10. The active sonar system of claim 1, wherein the carbon nanotube structure comprises a single linear carbon nanotube structure folded or winded to form a planar structure.

11. The active sonar system of claim 1, wherein the carbon nanotube structure comprises a plurality of linear carbon nanotube structures paralleled with each other, crossed with each other, or weaved together with each other to form a planar structure.

12. The active sonar system of claim 1, wherein the at least one carbon nanotube transmitting transducer further comprises a supporter; the at least one first electrode, the at least one second electrode, and the acoustic element are located on the supporter.

13. The active sonar system of claim 1, wherein the at least one carbon nanotube transmitting transducer comprises a plurality of first electrodes and a plurality of second electrodes, the first electrodes and the second electrodes are located alternately, the first electrodes are electrically connected to each other in parallel, and the second electrodes are electrically connected to each other in parallel.

14. The active sonar system of claim 13, wherein the first electrodes and the second electrodes are located in different planes; the acoustic element surrounds the first electrodes and the second electrodes to form a three-dimensional structure.

15. The active sonar system of claim 1, wherein the at least one receiver comprises at least one receiving transducer, the at least one receiving transducer being a piezoelectric transducer made of piezoelectric ceramic, a giant magnetostrictive transducer made of rare-earth alloy, or an electrostrictive transducer made of ferroelectric material.

16. The active sonar system of claim 1, further comprising an underwater carrier accommodating the at least one transmitter, the at least one receiver, and the electronic cabinet.

17. An active sonar system comprising:
    at least one transmitter to transmit an acoustic signal, the at least one transmitter comprising at least one cubic carbon nanotube transmitting transducer submerged in a liquid medium, the at least one cubic carbon nanotube transmitting transducer comprising different surfaces facing different directions, and is configured to transmit the acoustic signals toward different directions simultaneously by heating the liquid medium to cause a pressure oscillation in the liquid medium;
    at least one receiver to receive a reflected acoustic signal; and
    an electronic cabinet to control the at least one transmitter to transmit the acoustic signal and the at least one receiver to receive the reflected acoustic signal.

18. The active sonar system of claim 17, wherein the at least one cubic carbon nanotube transmitting transducer comprises at least one first electrode, at least one second electrode, at least one supporter, and an acoustic element comprising a carbon nanotube structure;
    the at least one first electrode, the at least one second electrode, and the at least one supporter are located in different planes; the acoustic element surrounds the at least one first electrode, the at least one second electrode, and the at least one supporter to form a three-dimensional structure;
the acoustic element is electrically connected to the at least one first electrode and the at least one second electrode.

19. An active sonar system comprising:
at least one transmitter to transmit an acoustic signal, the at least one transmitter comprising a carbon nanotube transmitting transducer array comprising a plurality of carbon nanotube structures used for transmitting the acoustic signal;
at least one receiver to receive a reflected acoustic signal; and
an electronic cabinet to control the at least one transmitter to transmit the acoustic signal and the at least one receiver to receive the reflected acoustic signal.

20. The active sonar system of claim 19, wherein the carbon nanotube transmitting transducer array comprises:
a substrate;
a plurality of first electrode down-leads located on the substrate arranged in parallel;
a plurality of second electrode down-leads located on the substrate arranged in parallel, the first electrode down-leads and the second electrode down-leads define a grid, each two adjacent first electrode down-leads and each two adjacent second electrode down-leads of the grid defines a plurality of cells;
a plurality of carbon nanotube transmitting transducers, each carbon nanotube transmitting transducer located in each cell, and comprising a first electrode, a second electrode, and an acoustic element comprising one of the plurality of carbon nanotube structures,
wherein the first electrode and the second electrode are electrically connected to the acoustic element.

* * * * *